(12) United States Patent
Lee et al.

(10) Patent No.: US 11,719,368 B2
(45) Date of Patent: Aug. 8, 2023

(54) COUPLING ASSEMBLY FOR PIPE CONNECTION AND METHOD OF MANUFACTURING THE SAME

(71) Applicant: NEW ASIAJOINT CO., LTD., Yeoju-si (KR)

(72) Inventors: Sang Heon Lee, Seoul (KR); Dong Il Han, Yeoju-si (KR)

(73) Assignee: NEW ASIAJOINT CO., LTD, Yeoju-si (KR)

( * ) Notice: Subject to any disclaimer, the term of this patent is extended or adjusted under 35 U.S.C. 154(b) by 618 days.

(21) Appl. No.: 16/850,815

(22) Filed: Apr. 16, 2020

(65) Prior Publication Data
US 2021/0324981 A1    Oct. 21, 2021

(51) Int. Cl.
*F16L 23/08* (2006.01)
(52) U.S. Cl.
CPC .................................. *F16L 23/08* (2013.01)
(58) Field of Classification Search
CPC ......... F16L 21/06; F16L 21/065; F16L 23/04; F16L 23/08; F16L 23/00; F16L 25/04; F16L 17/04; F16L 17/02
See application file for complete search history.

(56) References Cited

U.S. PATENT DOCUMENTS

2008/0048444 A1*  2/2008  Porter ..................... F16L 23/08
                                                    285/367

FOREIGN PATENT DOCUMENTS

KR    1020070012723    1/2007
KR      102033757    10/2019

OTHER PUBLICATIONS

English Translation KR 102033757 (Year: 2019).*

* cited by examiner

*Primary Examiner* — Aaron M Dunwoody
(74) *Attorney, Agent, or Firm* — Norton Rose Fulbright US LLP

(57) ABSTRACT

A coupling assembly for pipe connection and a method of manufacturing the same are disclosed. The coupling assembly for pipe connection is installable while a coupler is preassembled using a fastening member and is not deformed even in a fastening process so as to be stably fixed even after fastening. The coupling assembly is configured so that two or more couplers are disposed to face each other to connect pipes consecutively disposed in an axial direction and the pipes are connected while a fastening member is preassembled to the plurality of couplers, each of the couplers includes a locking part that is inserted into a fastening groove formed in the pipe, a portion of the locking part is inserted into the fastening groove, and the remaining portion of the locking part is disposed outside the fastening groove.

6 Claims, 13 Drawing Sheets

COUPLING ASSEMBLY FOR PIPE CONNECTION AND METHOD OF MANUFACTURING THE SAME

BACKGROUND

1. Field of the Invention

The present invention relates to a coupling assembly for pipe connection and a method of manufacturing the same, and more specifically, to a coupling assembly for pipe connection, which is installable while a coupler is preassembled using a fastening member and is not deformed in a fastening process so as to be stably fixed even after fastening, and a method of manufacturing the same.

2. Discussion of Related Art

Generally, couplings that connect pipes are used to connect pipes consecutively disposed in an axial direction.

The couplings are disposed in a circumferential direction of pipes and include a plurality of segments that are interconnectable, and the plurality of segments are coupled to each other by separate fastening members while being disposed at end portions of the pipes, and thus the consecutive pipes are connected.

In this case, fastening grooves are formed in both end portions of the pipe in a circumferential direction, and a part of the coupling is fastened to the fastening grooves while being inserted into the fastening grooves. This is because the coupling can support the pipes so that the pipes do not separate even when a force is applied in a direction in which a distance between the consecutive pipes is increased by fluid pressure in the pipes.

In the case of a conventional coupling, segments have arch-shaped surfaces to be inserted into the fastening grooves, the fastening grooves are formed in a shape in which a part of an external circumferential surface of a pipe is recessed. In this case, while the arch-shaped surfaces of the segments are seated in the fastening grooves, the segments are fastened to each other. A radius of curvature of the arch-shaped surfaces may be the same as that of an outer circumferential surface of the fastening groove so that the segments are stably fixed.

However, due to a structural feature that a radius of the outer circumferential surface of the pipe is greater than that of the outer circumferential surface of the fastening groove, the arch-shaped surfaces of the segments are seated in the fastening grooves in a manner in which each of the segments moves in a radial direction of the pipe while being disposed in the fastening grooves, and the segments are coupled to each other using fastening members. When the segments are disposed and fastened in the manner, since the segments should be coupled using the fastening member while the plurality of segments are maintained, it is difficult for a worker to work alone, and thus there was a problem of degraded work efficiency.

To solve the problem, in Korean Application No. 10-2007-0012723 (Published Jan. 26, 2007), a configuration that has increased work efficiency due to a radius of curvature of the arch-shaped surface of the segment being greater than that of the outer circumferential surface of the pipe is disclosed. That is, since the radius of curvature of the arch-shaped surface of the segment is greater than that of the outer circumferential surface of the pipe, the segments may move in an axial direction while being preassembled using fastening members, and thus the preassembled segments can move to a position at which the fastening grooves are formed along the outer circumferential surface of the pipe.

However, as described above, since the radius of the outer circumferential surface of the fastening groove is smaller than that of the outer circumferential surface of the pipe, Korean Application No. 10-2007-0012723 discloses segments which are deformable when the fastening member is tightened so that radius of curvature of the arch-shaped surface corresponds to the radius of the outer circumferential surface of the fastening groove so that the arch-shaped surfaces of the segments are seated on the outer circumferential surfaces of the fastening grooves.

Couplings used in a construction site are generally formed of cast iron. Considering both of a complicated shape and a manufacturing cost of the couplings, the couplings are manufactured through a casting process using cast iron.

However, while the segments made of a cast iron material and formed in the same structure as in Korean Application No. 10-2007-0012723 are fastened, the segments are broken and damaged in a deformation process due to the characteristic of a cast iron material having a high content of carbon, and thus there is a limit in that the segments in Korean Application No. 10-2007-0012723 cannot be applied in the actual field.

Therefore, there is an urgent need to solve the above-described problem.

SUMMARY OF THE INVENTION

The present invention is directed to providing a coupling assembly for pipe connection, which is installable while a coupler is preassembled using fastening members and is not deformed even in a fastening process so as to be stably fixed even after fastening, and a method of manufacturing the same.

According to an aspect of the present invention, there is provided a coupling assembly for pipe connection which is configured so that two or more couplers are disposed to face each other to connect pipes consecutively disposed in an axial direction and the pipes are connected while fastening members are preassembled to the plurality of couplers, each of the couplers includes a locking part that is inserted into a fastening groove formed in the pipe, a portion of the locking part is inserted into the fastening groove, and the remaining portion of the locking part is disposed outside the fastening groove.

Fastening parts to which fastening members are connected by passing through the fastening parts may be formed on both sides of the coupler, and an angle between the fastening parts in pairs before fastening of the couplers may be maintained to be the same as that after fastening of the couplers.

An arch-shaped surface that faces an outer circumferential surface of the fastening groove may be formed in the locking part, a portion of the arch-shaped surface may be seated and supported on the outer circumferential surface of the fastening groove, and the remaining portion of the arch-shaped surface may be disposed to be spaced apart from the outer circumferential surface of the fastening groove.

Minimum locking points may be formed on both sides of the locking part such that an insertion depth of the locking part is equal to half of a depth of the fastening groove, and the minimum locking points may be formed in a range of 0° to 41° along both sides of the arch-shaped surface.

According to another aspect of the present invention, there is provided a method of manufacturing a coupling assembly for pipe connection, which is configured so that two or more couplers are disposed to face each other to connect pipes consecutively disposed in an axial direction and the pipes are connected while a fastening member is preassembled to the plurality of couplers, wherein the method includes setting a radius of curvature of an arch-shaped surface formed in the coupler so that the radius of curvature of the arch-shaped surface formed in each of the couplers is greater than a radius of the outer circumferential surface of the pipe, and partially cutting both end portions of the arch-shaped surface.

The partially cutting of both end portions of the arch-shaped surface includes cutting overlapping portions of the arch-shaped surfaces while the arch-shaped surfaces facing each other parallelly moves in a radially inward direction of the pipe.

The partially cutting of both end portions of the arch-shaped surface may include calculating a difference between a radius of the fastening groove formed in the pipe and a radius of curvature of the arch-shaped surface, and forming a second string by parallelly moving a first string, which connects both ends of the arch-shaped surface, in a radially outward direction of the pipe by the difference calculated in the above operation and cutting both end portions of the arch-shaped surface exposed at the outside of the second string.

Alternatively, the fastening parts may include gap maintaining surfaces so that distances from the outer circumferential surfaces of the fastening grooves to the remaining portions of the arch-shaped surfaces decrease.

In this case, unlocking points at which the arch-shaped surfaces come out of the fastening grooves may be formed on both sides of the locking part, and the gap maintaining surfaces may extend downward from the unlocking points.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
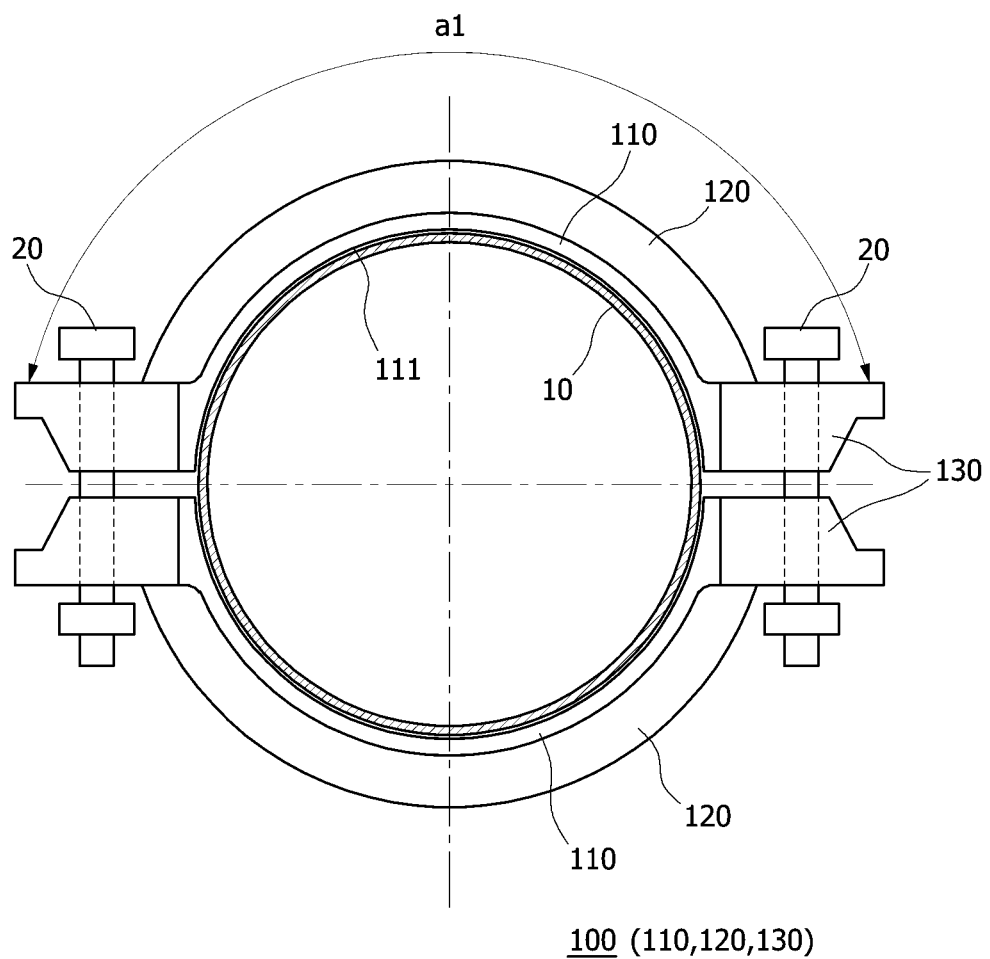
FIG. 1 is a front view illustrating a state before fastening of a coupling assembly according to one embodiment of the present invention.

Hereinafter, embodiments that are easily carried out by those skilled in the art will be described in detail with reference to the accompanying drawings. The embodiments of the present invention may be implemented in several different forms and are not limited to embodiments described herein. Parts irrelevant to description will be omitted in the drawings to clearly explain the embodiments of the present invention, and similar parts are denoted by similar reference numerals throughout this specification.

It should be further understood that the term "comprises" or "have" used in this specification specifies the presence of stated features, numerals, operations, components, parts, or a combination thereof but does not preclude the presence or addition of one or more other features, numerals, operations, components, parts, or a combination thereof.

Figure 2:
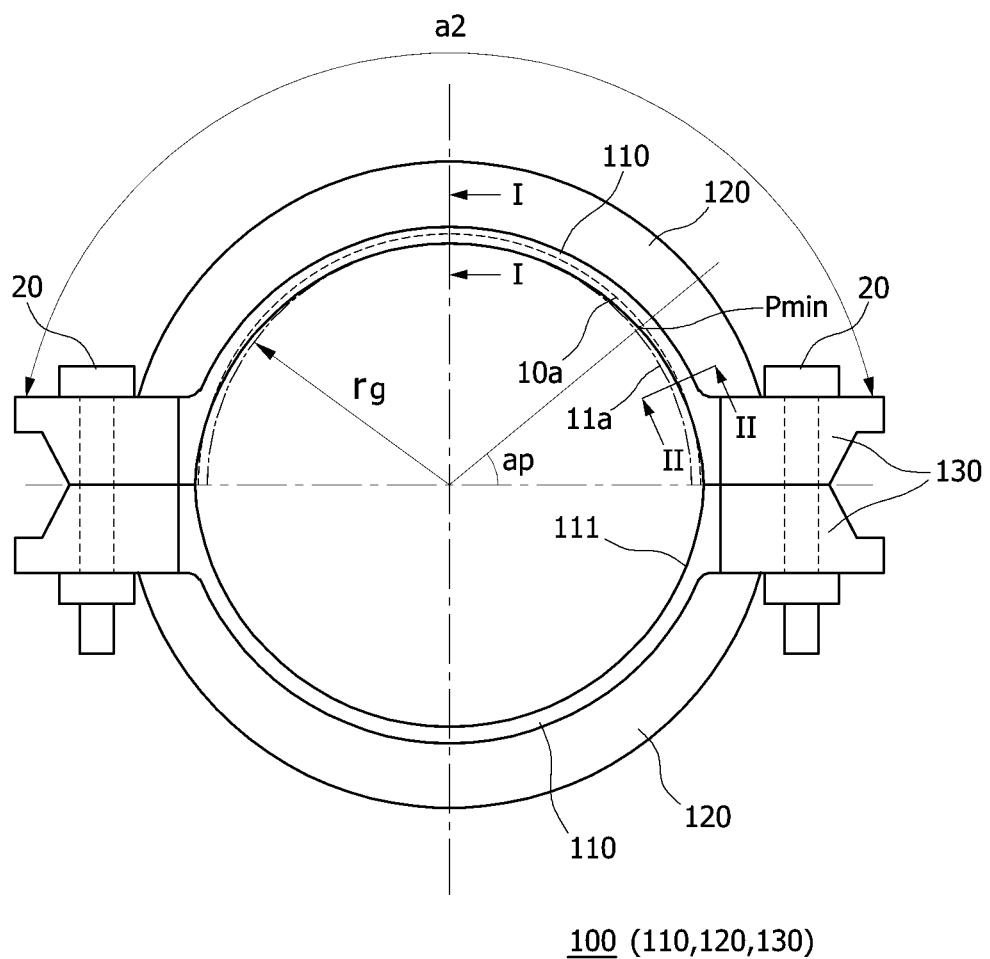
FIG. 2 is a front view illustrating a state after fastening of the coupling assembly according to one embodiment of the present invention.
Figure 3:
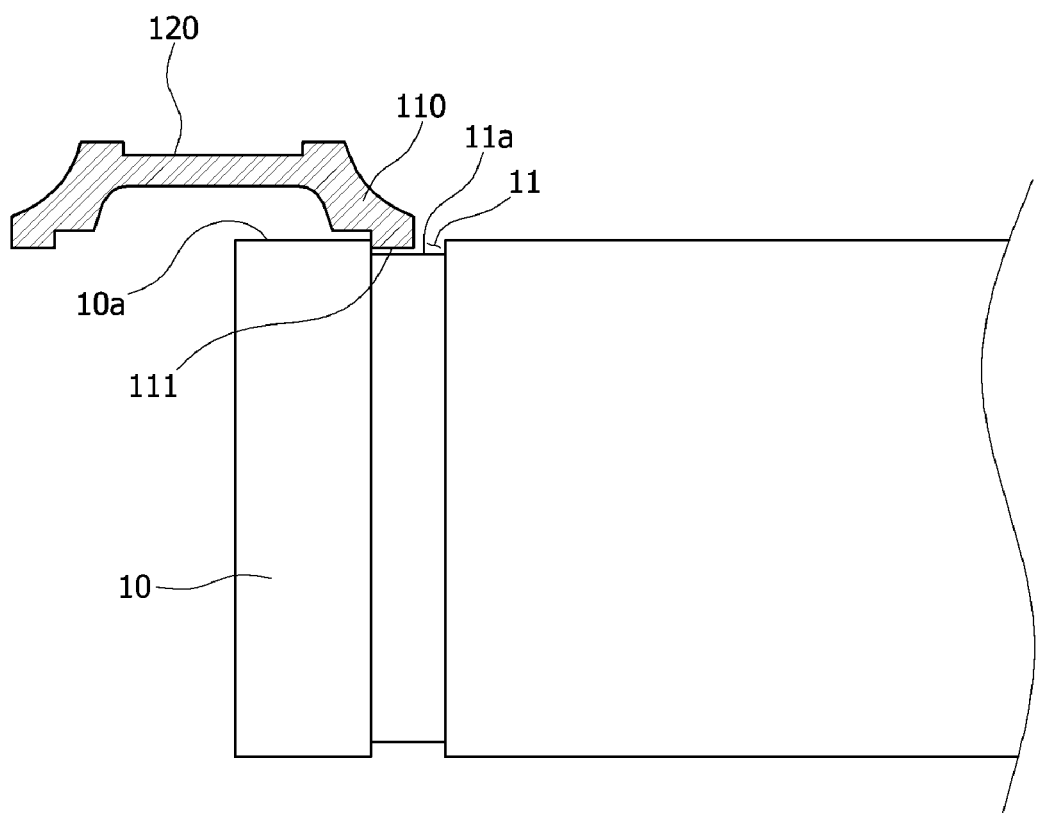
FIG. 3 is a cross-sectional view illustrating a state in which the coupling assembly according to one embodiment of the present invention is taken along a line in a radial direction of a pipe.
Figure 4:
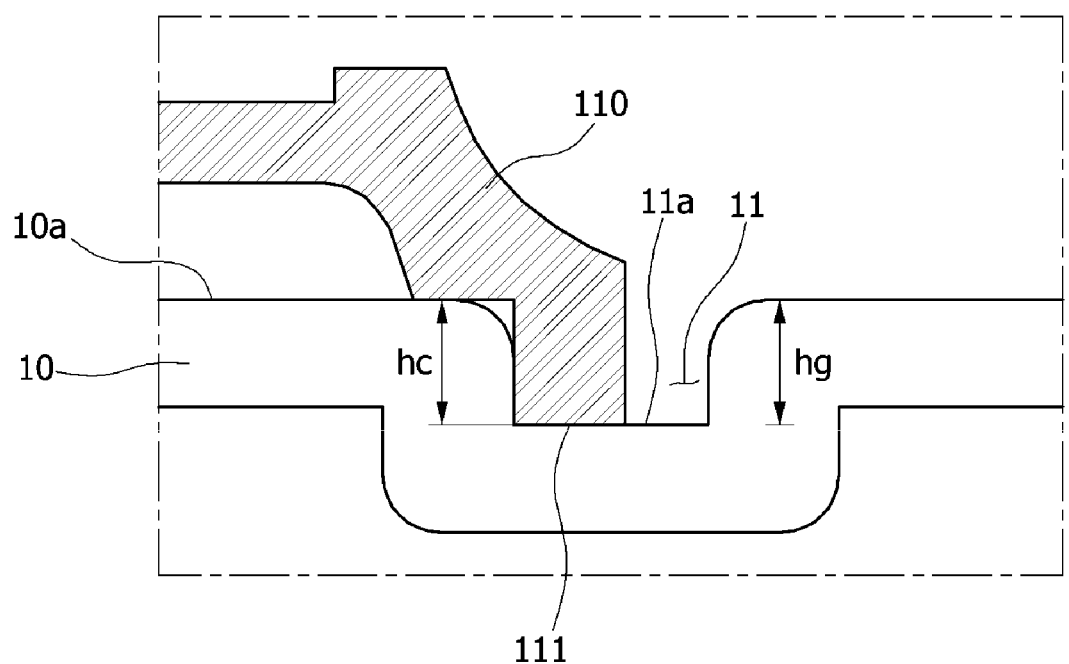
FIG. 4 is a cross-sectional view illustrating a state in which the coupling assembly according to one embodiment of the present invention is taken along line I-I in FIG. 2.
Figure 5:
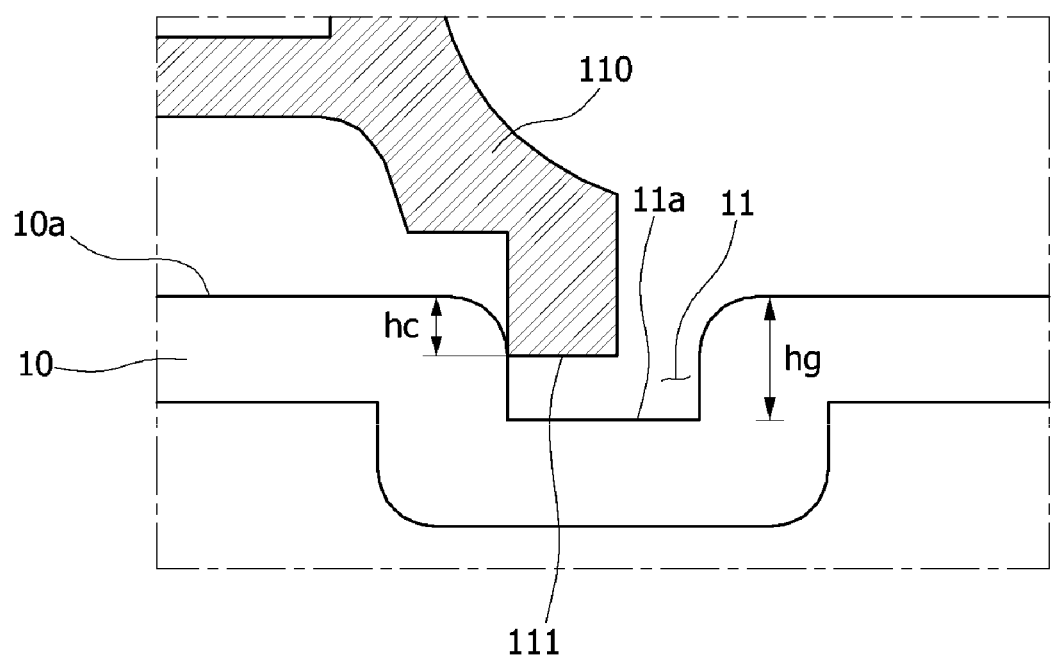
FIG. 5 is a cross-sectional view illustrating a state in which the coupling assembly according to one embodiment of the present invention is taken along line II-II in FIG. 2.
Figure 6:
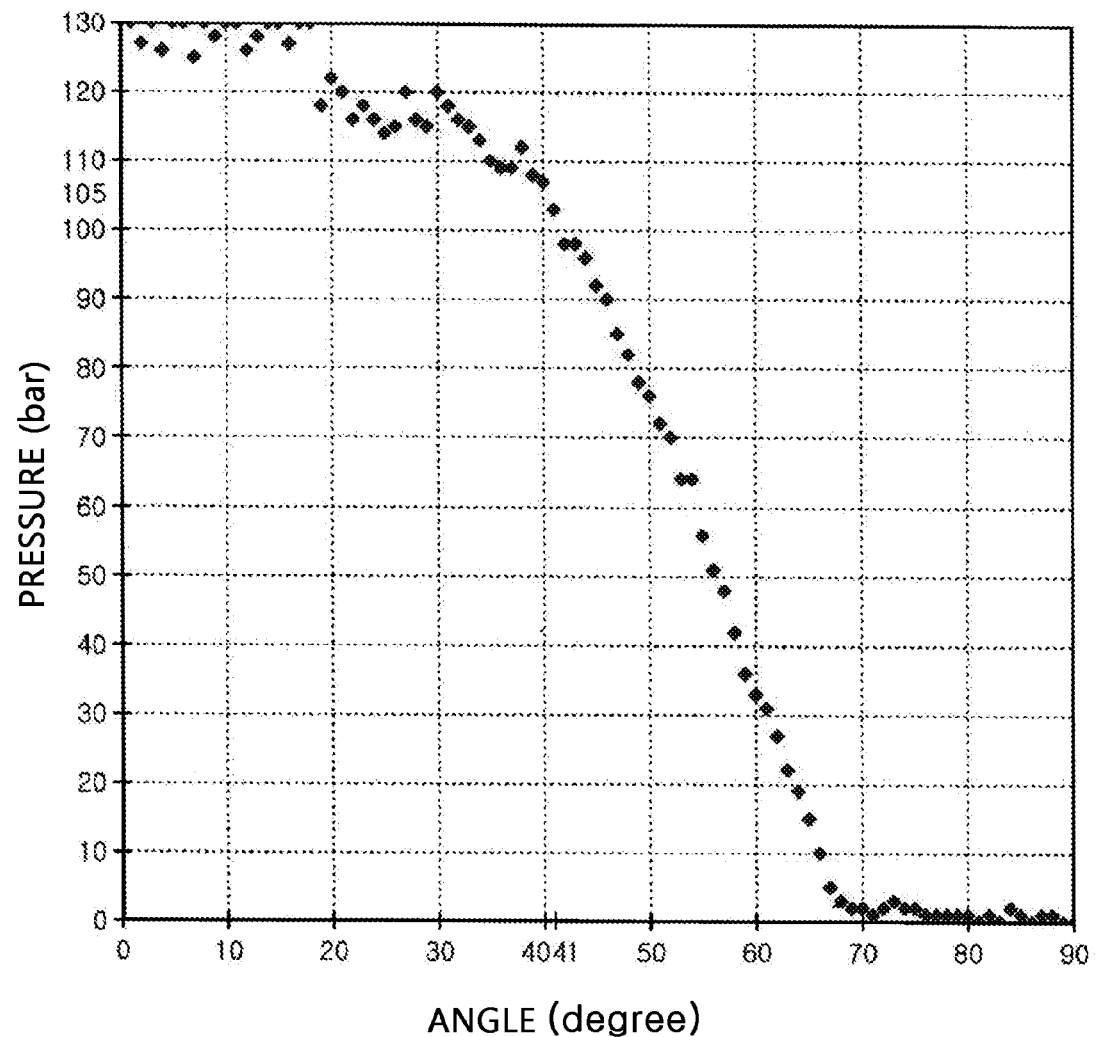
FIG. 6 is a performance graph illustrating the correlation between a formation angle of a minimum locking point and allowable water pressure in one embodiment of the present invention.
Figure 7:
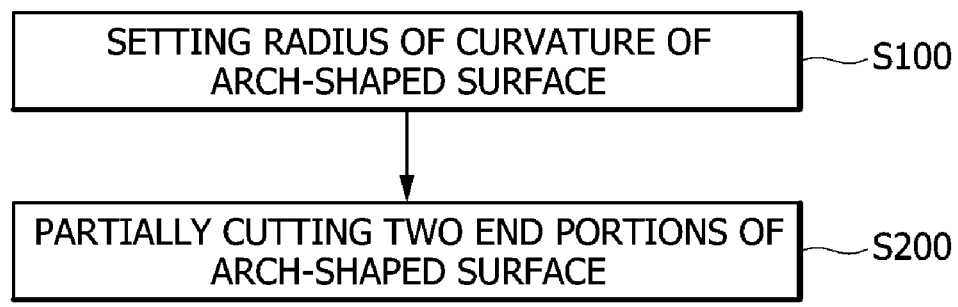
FIG. 7 is a flowchart illustrating a method of manufacturing a coupling assembly according to one embodiment of the present invention.
Figure 10:
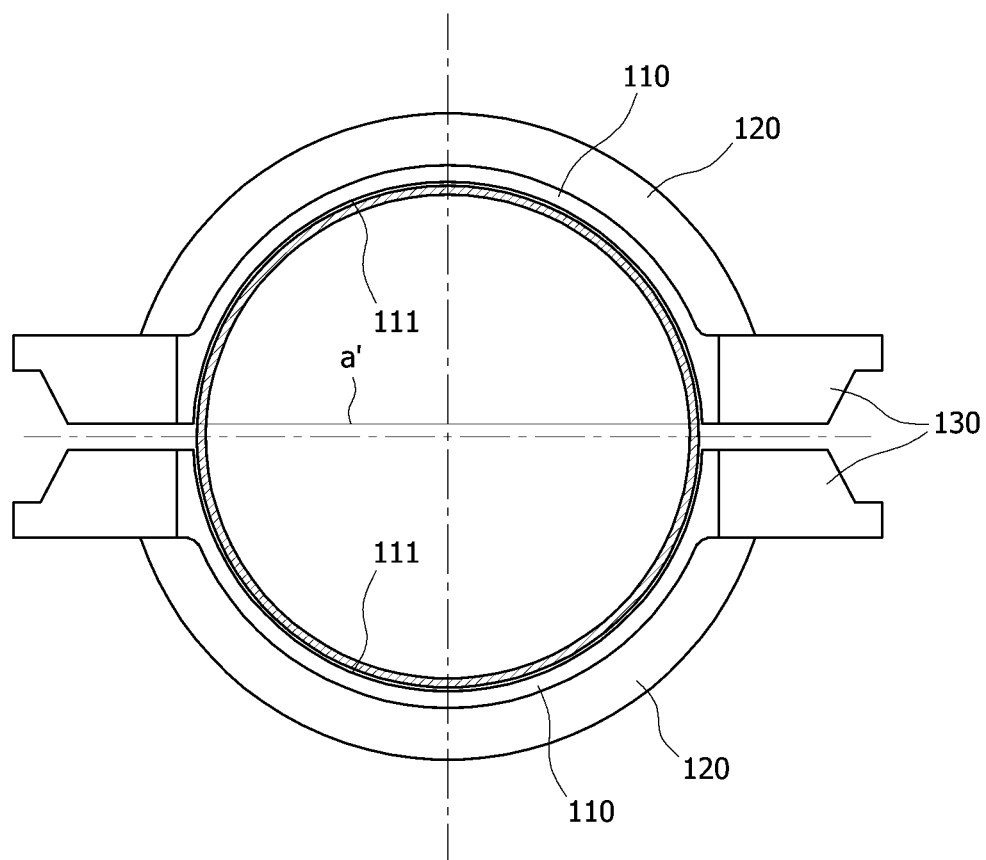
Figure 11:
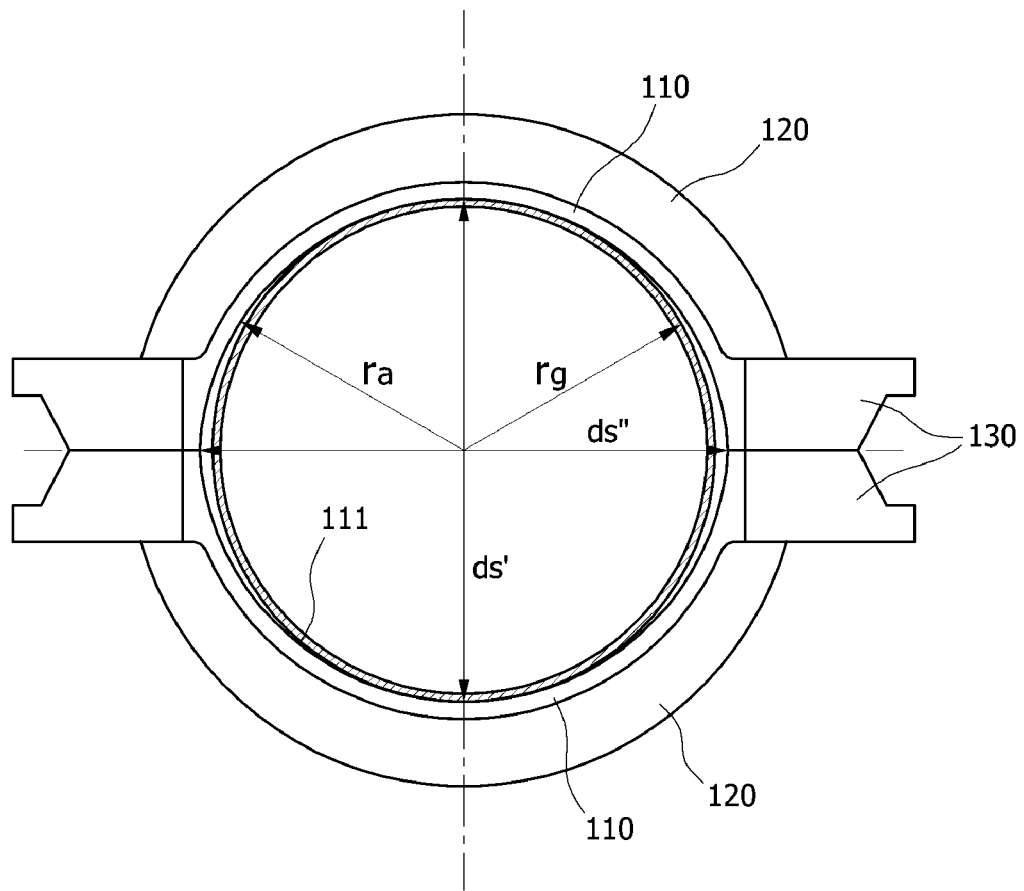
Figure 12:
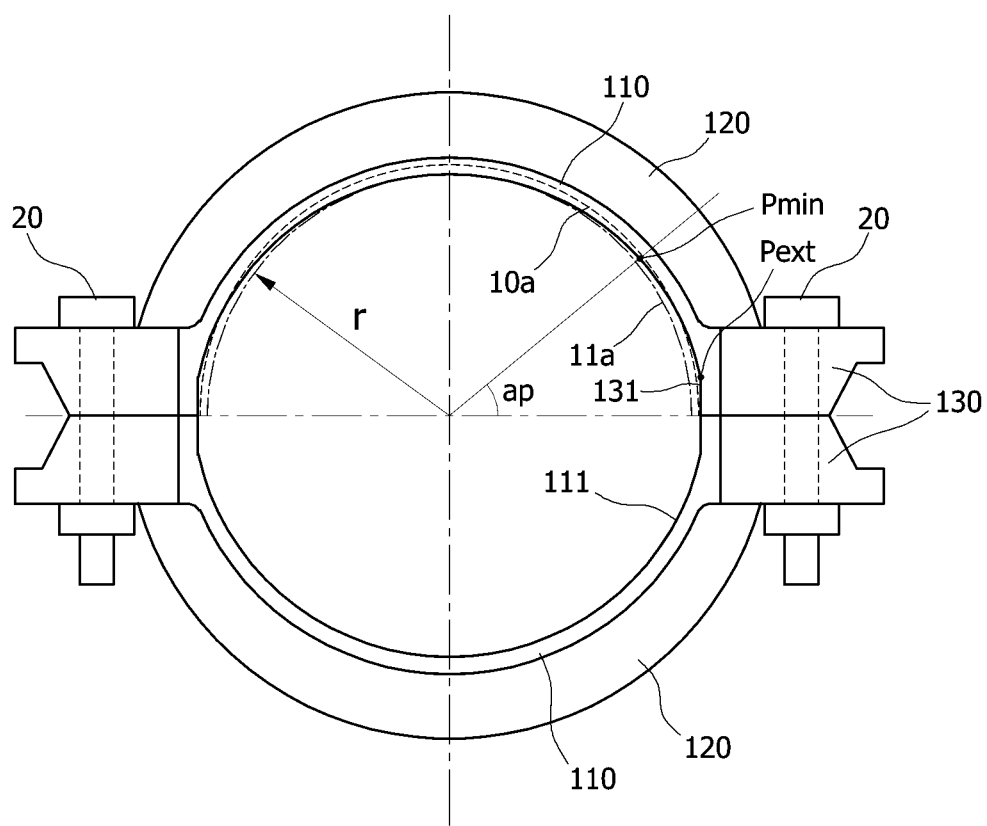
FIG. 12 is a front view illustrating a coupling assembly according to another embodiment of the present invention.
Figure 13:
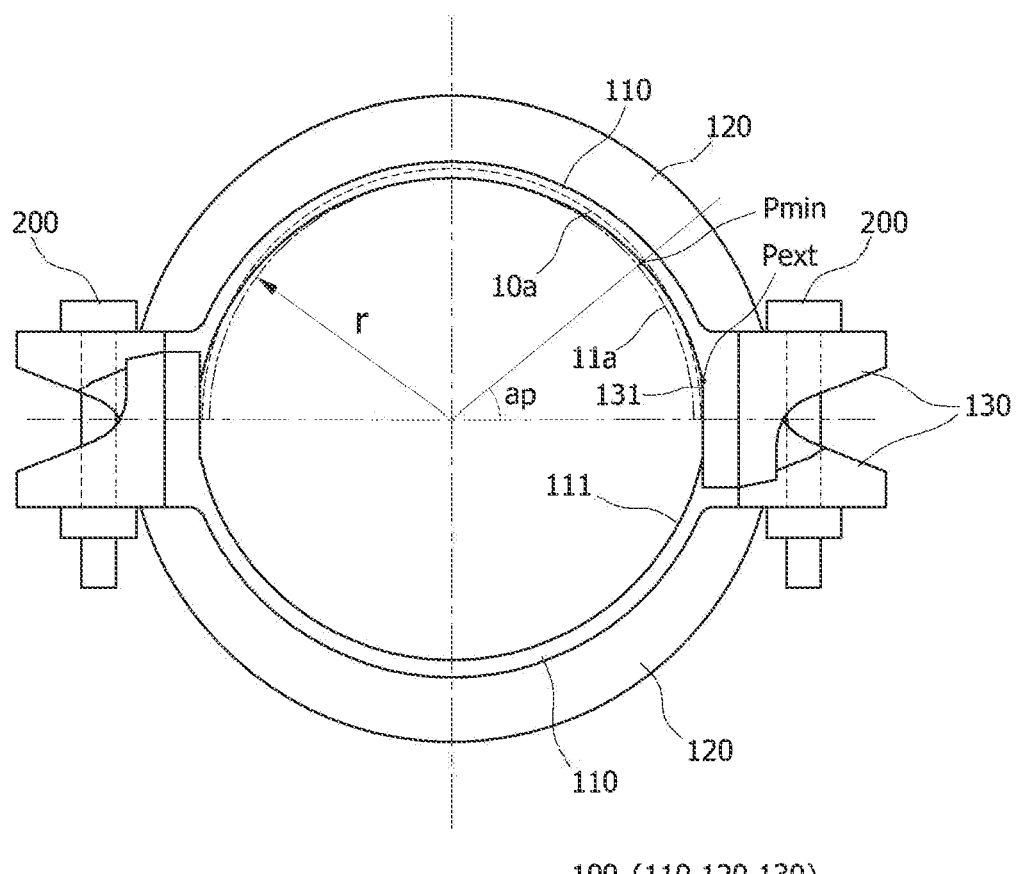
FIG. 13 is a front view illustrating a coupling assembly according to still another embodiment of the present invention.

FIG. 1 is a front view illustrating a state before fastening of a coupling assembly according to one embodiment of the present invention, FIG. 2 is a front view illustrating a state after fastening of a coupling assembly according to one embodiment of the present invention, FIG. 3 is a cross-sectional view illustrating a state in which the coupling assembly according to one embodiment of the present invention is taken along a line in a radial direction of a pipe, FIG. 4 is a cross-sectional view illustrating a state in which the coupling assembly according to one embodiment of the present invention is taken along line I-I in FIG. 2, FIG. 5 is a cross-sectional view illustrating a state in which the coupling assembly according to one embodiment of the present invention is taken along line II-II in FIG. 2, FIG. 6 is a performance graph illustrating the correlation between a formation angle of the minimum locking point and allowable water pressure in one embodiment of the present invention, FIG. 7 is a flowchart illustrating a method of manufacturing a coupling assembly according to one embodiment of the present invention, FIGS. 8 to 11 are cross-sectional views sequentially illustrating operations of manufacturing a coupling assembly according to one embodiment of the present invention, FIG. 12 is a front view illustrating a coupling assembly according to another embodiment of the present invention, and FIG. 13 is a front view illustrating a coupling assembly according to still another embodiment of the present invention.

A coupling assembly according to the present invention is configured so that two or more couplers 100 are disposed to face in order to connect pipes 10 consecutively disposed in an axial direction and the pipes 10 are connected while fastening members 200 are preassembled to the plurality of couplers 100.

In this case, as shown in FIGS. 1 to 5, the couplers 100 include locking parts 110 that are inserted into fastening grooves 11 formed in the pipe 10. That is, in a state in which the couplers 100 are preassembled, the preassembled couplers 100 are disposed on one end portions of the pipes 10, each of the locking parts 110 of the couplers 100 is disposed outside of an outer circumferential surface 10a in a radial direction of the pipe 10 so that the couplers 100 move in an axial direction of the pipes 10, and a radius ra of curvature of an arch-shaped surface 111 formed in the locking part 110 is greater than a radius of curvature of the outer circumferential surface 10a of the pipe 10.

In this configuration, two or more couplers 100 are installable on the pipes 10 even while being preassembled using fastening members 20, and thus work efficiency can be increased.

Each of the couplers 100 includes a first locking part 110 that is inserted into the fastening groove 11 formed in a first pipe 10, a second locking part 110 that is inserted into the fastening groove 11 formed in a second pipe 10, and a body part 120 that connects the first locking part 110 with the second locking part 110. Further, a leakage prevention member (not shown) that has elasticity is provided in a space formed by the body part 120 and the locking part 110 so as to prevent a leakage of a fluid that flows in the pipes 10.

Further, the couplers 100 include fastening parts 130 through which the fastening members 20 pass, and the fastening members 20 simultaneously pass through the fastening parts 130 formed in the couplers 100 that face each other, and thus the couplers are fastened.

When the consecutively disposed pipes 10 and the preassembled couplers 100 are installed at the right position, a fastening force is applied using the fastening members 20. When the fastening force is applied, the couplers 100 disposed to face each other parallelly move in a radially inward direction of the pipe 10. When the fastening parts 130 formed in the couplers 100 come into contact with each other, the couplers 100 do not move, and in this state, a predetermined level of fastening torque is applied to the fastening members 20.

As described above, when the couplers 100 parallelly move in the radially inward direction of the pipe 10, the locking parts 110 formed in the couplers 100 are inserted into the fastening grooves 11, and the pipes 10 are supported so as not to be separated in the axial direction due to fluid pressure in the pipes 10.

However, since the radius ra of curvature of the arch-shaped surface 111 formed in the locking part 110 is greater than the radius ro of curvature of the outer circumferential surface 10a of the pipe 10, upper portions of the locking parts 110 are inserted into the fastening grooves 11, but a degree of insertion into the fastening groove 11 from the upper portion of the locking part 110 to a lower portion thereof decreases. That is, a portion of the locking part 110 is inserted into the fastening groove 11, and the remaining portion of the locking part 110 is disposed outside of the fastening groove 11. That is, as shown in FIG. 2, an upper end portion of the arch-shaped surface 111 is disposed radially inside the outer circumferential surface 10a of the pipe 10 and a lower end portion of the arch-shaped surface 111 is disposed outside the fastening groove 11 while being disposed radially outside the outer circumferential surface 10a of the pipe 10.

Therefore, depending on the size of the radius of curvature of the arch-shaped surface 111 formed in the locking part 110, a size of the locking part 110 disposed inside the fastening groove 11 is variously changed. In addition, according to this, a size of the locking part 110 disposed outside the fastening groove 11 is also variously changed. As the radius ra of curvature of the arch-shaped surface 111 formed in the locking part 110 increases, it may be easy to insert the coupler 100 into the end portion of the pipe preassembled state, but as a size of the locking part 110 disposed in the fastening groove 11 is decreased, when a force is applied in a direction in which a distance between the consecutive pipes 10 is increased due to fluid pressure in the pipes 10, the pipes 10 cannot be effectively supported.

Therefore, the radius of curvature of the arch-shaped surface 111 may be set in a range in which the couplers 100 are easily installed while being preassembled and durability is secured even when a force is applied through a fluid.

When configured as described above, the arch-shaped surface 111 formed in the locking part 110 is disposed to face the outer circumferential surface 11a of the fastening groove 11, and as shown in FIG. 2, one portion of the arch-shaped surface 111 is seated and supported on the outer circumferential surface 11a of the fastening groove 11, and the remaining portion of the arch-shaped surface 111 is disposed to be spaced apart from the outer circumferential surface 11a of the fastening groove 11.

That is, even when the couplers 100 are not deformed in a fastening process of the couplers 100, the arch-shaped surfaces 111 formed in the locking parts 110 are seated in the fastening grooves 11 formed in the pipes 10, and thus the couplers 100 are stably fixed.

Further, since the couplers 100 are not deformed in a fastening process of the couplers 100, an initial formation angle a1 of the fastening part 130 provided on both sides of the coupler 100 is maintained to be the same as a final formation angle a2 after fastening.

When the couplers are taken along line I-I shown in FIG. 2, as shown in FIG. 4, the arch-shaped surface 111 formed in the locking part 110 is supported to be seated on the outer circumferential surface 11a of the fastening groove 11. Further, when the couplers are taken along line II-II in FIG. 2, as shown in FIG. 5, the arch-shaped surface 111 formed in the locking part 110 is disposed to be spaced apart from the outer circumferential surface 11a of the fastening groove 11.

That is, as described above, a separation distance between the arch-shaped surface 111 and the outer circumferential surface 11a of the fastening groove 11 is increased in a direction from an upper portion of the locking part 110 toward a lower portion thereof.

As shown in FIG. 4, since the arch-shaped surface 111 is seated on the outer circumferential surface 11a of the fastening groove 11, a separation distance is not formed, and thus an insertion depth hc of the locking part 110 is the same as a fastening groove depth hg, but in the case of FIG. 5, the arch-shaped surface 111 is disposed to be spaced apart from the outer circumferential surface 11a of the fastening groove 11, and thus the insertion depth hc of the locking part 110 is smaller than the fastening groove depth hg. That is, the insertion depth hc of the locking part 110 is decreased in a direction from the upper portion of the locking part 110 toward the lower portion thereof.

In this case, to form the fastening groove 11 in the pipe 10, an external force is applied to the outer circumferential surface 10a of the pipe 10, and the outer circumferential surface 10a of the pipe 10 is deformed. In this process, a portion at which the outer circumferential surface 10a of the pipe 10 is connected with the fastening groove 11 is curved so that a curved portion is formed.

That is, when the locking part 110 is inserted into the fastening groove 11 to some extent due to the curved part, the pipes can be stably supported. Considering a shape of the fastening groove 11 of the pipe 10, to stably support the pipe 10, the locking part 110 should be inserted to an insertion depth hc corresponding to half of a fastening groove depth hg, and a position formed on the arch-shaped surface 111 is determined as a minimum locking point Pmin.

A formation angle of the minimum locking point Pmin varies according to a size of the radius ra of curvature of the arch-shaped surface 111 formed in the locking part 110. That is, when lowermost ends provided on both sides of the locking part 110 are set to 0° and uppermost ends of the locking part 110 are set to 90°, the minimum locking points Pmin are formed on both sides of the locking part 110 in a range of 0° to 90°. However, as the radius ra of curvature of the arch-shaped surface 111 is increased, a formation angle ap of the minimum locking point Pmin is increased, and as the radius ra of curvature of the arch-shaped surface 111 is decreased, the formation angle ap of the minimum locking point Pmin is decreased.

However, the minimum locking point Pmin may be formed within a range in which allowable water pressure is satisfied after fastening of the couplers 100. The formation angle of the minimum locking point Pmin may determine whether the couplers 100 are easily inserted into end portions of the pipes 10 when installing the couplers 100 in the preassembled state in the pipes 10 and may determine whether the pipes are effectively supported when a force is applied in a direction in which a distance between the consecutive pipes 10 is increased due to pressure of fluid in the pipe 10, and thus the formation angle ap of the locking points Pmin needs to be carefully determined.

As shown in FIG. 6, in the correlation between the formation angle ap of the minimum locking point Pmin and the allowable water pressure, as the minimum locking point Pmin is formed at a small angle, it is confirmed that the allowable water pressure is increased. That is, the formation angle ap of the minimum locking point Pmin and the allowable water pressure are inversely proportional.

Generally, a representative standard related to the coupler 100 for connection of the pipe 10 includes an Underwriters Laboratories (UL) standard in the United States, and according to the UL standard, the coupler 100 for connection of the pipes 10 should withstand water pressure corresponding to five times the water pressure used.

That is, since the water pressure used in a building is generally about 21 bar, the coupler 100 for connection of the pipes 10 should withstand minimum water pressure of 105 bar according to the UL standard.

Therefore, when checking the allowable water pressure of the coupler 100 while the formation angle ap of the minimum locking point Pmin is changed, as shown in FIG. 6, the allowable water pressure of 105 bar specified in the UL standard may be satisfied when the formation angle ap of the minimum locking point Pmin is 41°. When the formation angle ap of the minimum locking point Pmin is greater than 41°, the allowable water pressure of the coupler 100 is decreased sharply, and thus it is hard to apply the coupler 100.

Therefore, the formation angle ap of the minimum locking point Pmin may be formed in a range of 0° to 41°.

Further, as shown in FIG. 7, a method of manufacturing the coupling assembly according to the present invention includes an operation (S100) of setting a radius ra of curvature of an arch-shaped surface 111 so that the radius ra of curvature of an arch-shaped surface 111 formed in each of the couplers 100 facing each other is greater than a radius ro of an outer circumferential surface 10a of the pipe 10 and an operation (S200) of partially cutting both end portions of the arch-shaped surface 111, wherein the coupling assembly is configured to connect pipes 100 while fastening members 20 are preassembled to the plurality of couplers 100, and two or more couplers 100 are disposed to face each other.

Figure 8:
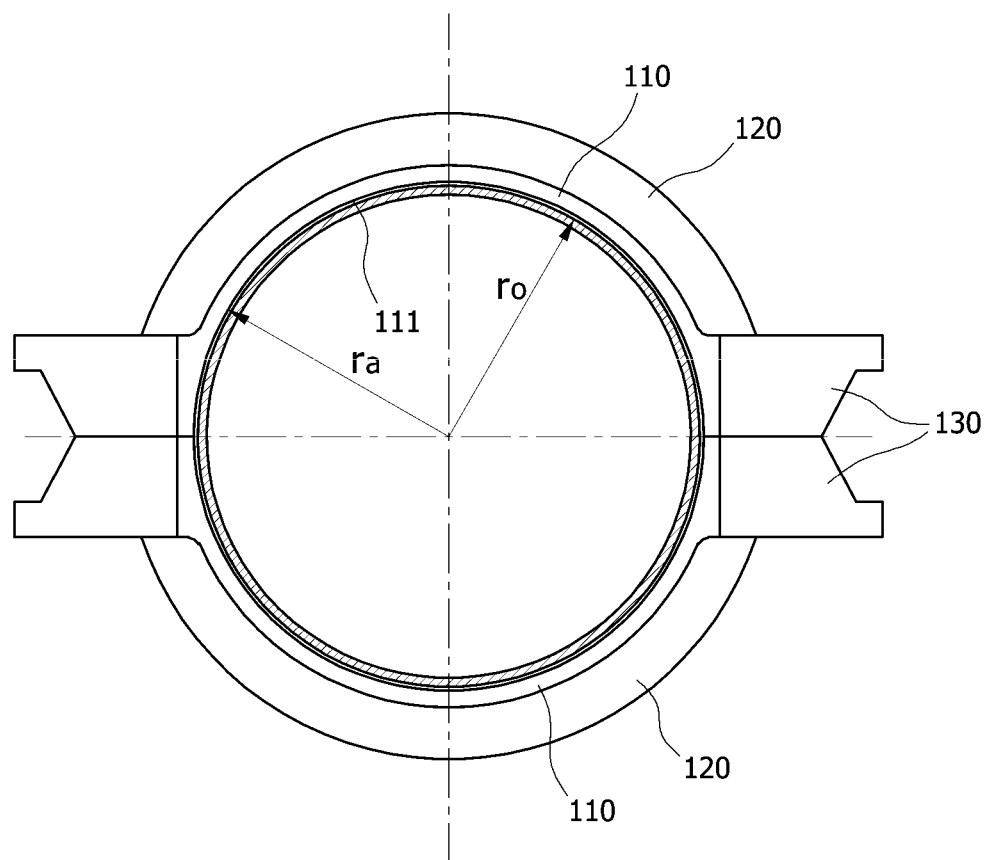
FIGS. 8 to 11 are cross-sectional views sequentially illustrating operations of manufacturing a coupling assembly according to one embodiment of the present invention.

The coupling assembly may be configured though the above-described process so that the preassembled couplers 100 are installed on the pipes 10, and the couplers 100 are fastened using fastening members 20 provided in the preassembled couplers 100 installed on the pipes 10. In the fastening process, the couplers 100 parallelly move in the radially inward direction of the pipe 10. However, as shown in FIG. 8, since the arch-shaped surfaces 111 of the couplers 100 are disposed to be in contact with each other, in this state, the couplers 100 cannot move to be fastened, and thus the arch-shaped surfaces 111 disposed to face each other are partially cut. In this case, when the arch-shaped surface 111 and the fastening parts 130 are partially cut, an overlapping portion of the facing arch-shaped surfaces 111 may be cut when the couplers 100 parallelly move in a radially inward direction of the pipe 10 so that the arch-shaped surfaces 111 are seated on the outer circumferential surfaces 11a of the fastening grooves 11 of the pipe 10. In this case, an overlapping portion of the fastening parts 130 besides the overlapping portion of the arch-shaped surfaces 111 may be also cut.

As described above, when the overlapping portions of the arch-shaped surfaces 111 and the fastening parts 130 are cut when the couplers 100 parallelly move in the radially inward direction of the pipe 10, interference between the couplers 100 is not caused even when fastening is performed using the fastening members 20, and thus ease of fastening and stable support are possible.

Alternatively, the operation (S200) of partially cutting both end portions of the arch-shaped surface 111 may include calculating a difference between a radius rg of the fastening groove 11 formed in the pipe 10 and a radius of curvature of the arch-shaped surface 111, forming a second string a' by parallelly moving a first string a, which connects both ends of the arch-shaped surface 111, in the radially outward direction of the pipe 10 by the difference calculated in above operation, and cutting both end portions of the arch-shaped surface 111 exposed at the outside of the second string a'.

That is, when a difference between the radius ra of curvature of the arch-shaped surface 111 and the radius rg of the fastening groove 11 formed in the pipe is calculated, in a fastening process, a parallel movement distance 1 may be calculated to determine how much should the couplers 100 parallelly move in a radially inward direction of the pipe 10.

Figure 9:
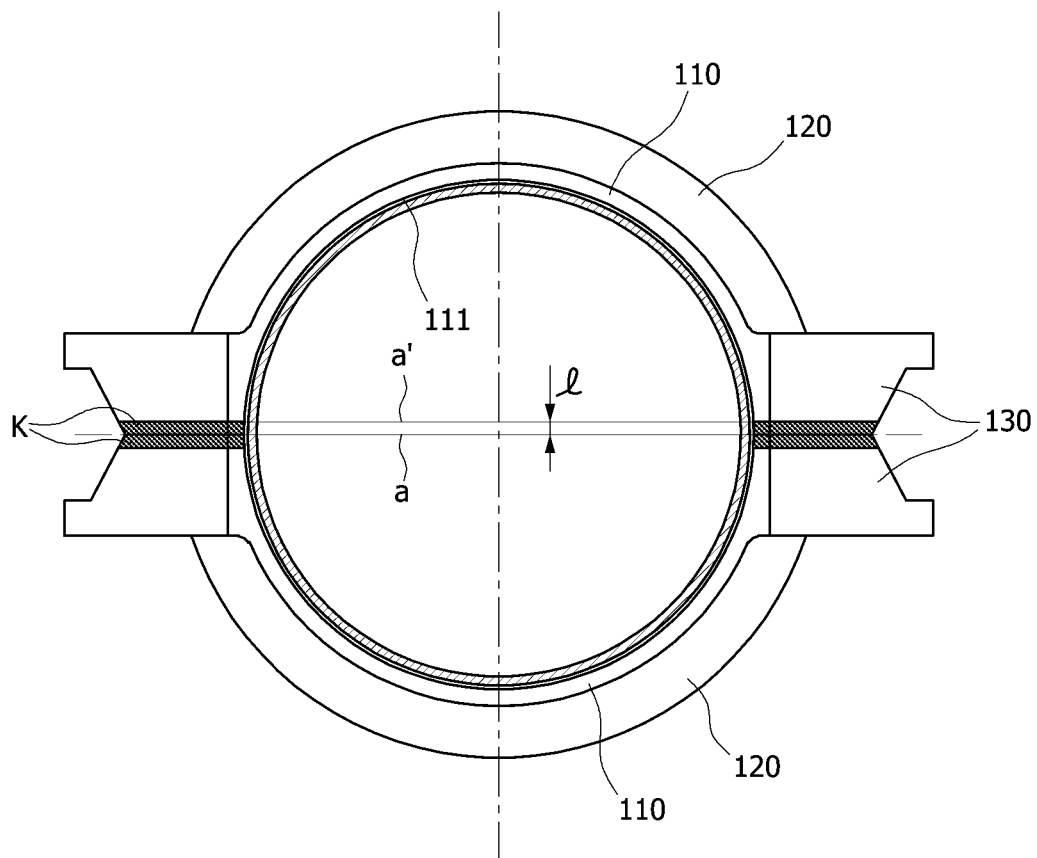

As shown in FIG. 9, the first string a that connects both ends of the arch-shaped surface 111 parallelly moves in the radially outward direction of the pipe 10 by the above-described parallel movement distance 1 so that the second string a' is formed, and a cutting portion k exposed at the outside of the second string a' is cut. In this case, when both ends of the arch-shaped surface 111 and the fastening parts 130 are cut, the couplers 100 are formed as shown in FIG. 10.

As shown in FIG. 11, a plurality of axes are formed on inner circumferential surfaces of the couplers 100 manufactured in the above-described method. That is, a short axis ds' that connects uppermost ends of the couplers 100 and a long axis ds" that connects lowermost ends of the couplers 100 are formed. Therefore, since a distance to the arch-shaped surface 111 is the same as a radius of the fastening groove 11 at a portion at which the short axis ds' is formed, the arch-shaped surfaces 111 of the couplers 100 are seated and supported on the outer circumferential surfaces 11a of the fastening grooves 11 when the fastening members 20 are fastened. A distance to the arch-shaped surface 111 at a portion at which the long axis ds" is formed is greater than a radius rg of the fastening groove 11, and thus the arch-shaped surfaces 111 of the couplers 100 are disposed to be spaced apart from the outer circumferential surfaces 11a of the fastening grooves 11 even when the fastening members 20 are fastened.

When the coupling assembly is manufactured in this method, the coupling assembly is simply manufactured, and thus production efficiency can be increased.

Further, as shown in FIGS. 12 and 13, gap maintaining surfaces 131 may be formed in the fastening parts 130 so that distances from the outer circumferential surfaces of the fastening grooves 11 to the remaining portions of the arch-shaped surfaces 111 are decreased. That is, as described above, since the couplers 100 are not deformed in a fastening process of the couplers 100, the arch-shaped surface 111 formed in the locking part 110 is separated from the outer circumferential surface 11a of the fastening groove, and the separation distance is increased in a direction toward a lower portion of the coupler 100. However, when gap maintaining surfaces 131 that extend downward toward the fastening parts 130 are formed, distances from the outer circumferential surfaces 11a of the fastening grooves to the arch-shaped surfaces 111 are decreased, and thus more stable fastening is possible.

In this case, unlocking points Pext at which the arch-shaped surfaces 111 come out of the fastening grooves 11 are formed on both sides of the locking part 110, and the above-described gap maintaining surfaces 131 extend downward from the unlocking points Pext, and thus the unlocking points Pext may be formed at positions at which the gap maintaining surfaces 131 are in contact with the outer circumferential surfaces 11a of the fastening grooves after the couplers 100 are assembled. Therefore, after fastening of the couplers 100, the arch-shaped surfaces 111 do not come out of the fastening grooves 11 and may be disposed in the fastening groove 11, and thus a fastening state can be maintained stably.

However, since the gap maintaining surfaces 131 are formed, when the couplers 100 are fastened, the couplers may be fastened while the facing couplers 100 move radially outward and the arch-shaped surfaces 111 completely come out of the fastening grooves 11.

According to the coupling assembly for pipe connection of the present invention having the above configuration and the method of manufacturing the same, at least two couplers are installable on pipes while being preassembled using fastening members, and thus work efficiency can be increased.

Further, since the coupling assembly for pipe connection is formed to be seated in the fastening groove even when a coupling is not deformed in a process of fastening the coupling, the coupling assembly for pipe connection is stably fixed after fastening, and thus water pressure required in a site can be sufficiently satisfied.

Further, the coupling assembly can be manufactured through a simple method, and thus production efficiency can be increased.

The embodiments of the present invention have been described above, but the spirit of the present invention is not limited to the embodiments disclosed in the specification. It should be understood by those skilled in the art that other embodiments may be easily suggested by addition, modification, or removal of components without departing from the spirit of the present invention as defined by the appended claims, and the embodiments may be also included within the scope of the appended claims.

What is claimed is:

1. A coupling assembly for pipe connection, which is configured so that two or more couplers are disposed to face each other to connect pipes consecutively disposed in an axial direction and the pipes are connected while a fastening member is preassembled to the plurality of couplers, the coupling assembly comprising a locking part formed in the coupler and inserted into a fastening groove formed in the pipe,
    wherein a portion of the locking part is inserted into the fastening groove, and a remaining portion of the locking part is disposed outside the fastening groove,
    wherein fastening parts to which a plurality of fastening members are connected by passing through the fastening parts are formed on both sides of the coupler, and
    an angle between the fastening parts in pairs before fastening of the couplers may be maintained to be the same as that after fastening of the couplers,
    wherein an arch-shaped surface that faces an outer circumferential surface of the fastening groove is formed in the locking part,
    a portion of the arch-shaped surface is seated and supported on the outer circumferential surface of the fastening groove, and
    a remaining portion of the arch-shaped surface is disposed to be spaced apart from the outer circumferential surface of the fastening groove,
    wherein minimum locking points are formed on both sides of the locking part such that an insertion depth of the locking part is equal to half of a depth of the fastening groove, and
    wherein the minimum locking points are formed in a range of 0° to 41° along both sides of the arch-shaped surface.

2. The coupling assembly of claim 1, wherein the fastening parts include gap maintaining surfaces so that distances from the outer circumferential surfaces of the fastening grooves to the remaining portions of the arch-shaped surfaces decrease.

3. The coupling assembly of claim 2, wherein unlocking points at which the arch-shaped surface come out of the fastening groove are formed on both sides of the locking part, and
    the gap maintaining surfaces extend downward from the unlocking points.

4. A method of manufacturing a coupling assembly for pipe connection according to claim 1, which is configured so that two or more couplers are disposed to face each other to connect pipes consecutively disposed in an axial direction and the pipes are connected while a fastening member is preassembled to the plurality of couplers, the method comprising:
    setting a radius of curvature of an arch-shaped surface formed in each of the couplers so that the radius of curvature of the arch-shaped surface formed in the coupler is greater than a radius of the outer circumferential surface of the pipe; and
    partially cutting both end portions of the arch-shaped surface.

5. The method of claim 4, wherein the partially cutting of both end portions of the arch-shaped surface includes cutting overlapping portions of the arch-shaped surfaces while the arch-shaped surfaces facing each other parallelly move in a radially inward direction of the pipe.

6. The method of claim 4, wherein the partially cutting of both end portions of the arch-shaped surface includes:

calculating a difference between a radius of the fastening groove formed in the pipe and a radius of curvature of the arch-shaped surface; and forming a second string by parallelly moving a first string, which connects two ends of the arch-shaped surface, in a radially outward direction of the pipe by the difference calculated in the above operation and cutting both end portions of the arch-shaped surface exposed at the outside of the second string.

\* \* \* \* \*